United States Patent [19]

Shoda

[11] Patent Number: 5,075,593

[45] Date of Patent: Dec. 24, 1991

[54] LIGHTING CONTROL CIRCUIT FOR HEAD LAMPS

[75] Inventor: Yasushi Shoda, Ojima, Japan

[73] Assignee: Fuji Jukogyo Kabushiki Kaisha, Tokyo, Japan

[21] Appl. No.: 650,617

[22] Filed: Feb. 6, 1991

[30] Foreign Application Priority Data

Feb. 9, 1990 [JP]  Japan .................................. 2-12411

[51] Int. Cl.⁵ ............................................ B60Q 1/02
[52] U.S. Cl. ....................................... 315/82; 315/83; 307/10.8
[58] Field of Search ............................. 315/80, 82, 83; 307/10.8

[56] References Cited

U.S. PATENT DOCUMENTS

| | | | |
|---|---|---|---|
| 3,391,301 | 7/1968 | Poznik | 315/83 |
| 3,644,886 | 2/1972 | Sabaroff | 315/82 |
| 3,723,721 | 3/1973 | Weber | 315/82 X |
| 4,713,584 | 12/1987 | Jean | 315/83 |
| 4,841,199 | 6/1989 | Irie | 315/83 |
| 4,934,769 | 6/1990 | Kurozu et al. | 315/83 |
| 4,949,012 | 8/1990 | Irick et al. | 315/82 |
| 5,030,884 | 7/1991 | Roussey et al. | 315/83 |

FOREIGN PATENT DOCUMENTS

| | | | |
|---|---|---|---|
| 0004441 | 1/1985 | Japan | 315/82 |
| 0012352 | 1/1985 | Japan | 315/82 |
| 0053255 | 3/1987 | Japan | 315/82 |
| 2194692 | 3/1983 | United Kingdom | 315/82 |

Primary Examiner—Eugene R. LaRoche
Assistant Examiner—Son Dinh
Attorney, Agent, or Firm—Beveridge, DeGrandi & Weilacher

[57] ABSTRACT

A lighting control circuit for head lamp has three relays with coils. When a lighting switch is turned on, high beams of right and left head lamps are lit. When the dimmer switch is turned on, low beams of right and left head lamps are lit. When the lighting switch is turned off, right and left head lamps are lit by low voltage which is equal to 50% of a rated voltage so as to improve the durability of the head lamps.

4 Claims, 4 Drawing Sheets

LIGHTING CONTROL CIRCUIT FOR HEAD LAMPS

BACKGROUND OF THE INVENTION

The present invention relates to a lighting control circuit for head lamps in automobiles etc.

Usually, a head lamp circuit for an automobile is connected from a battery to head lamps, each having a high-beam filament and a low-beam filament, via a lighting switch as well as a dimmer switch, and it energizes either the high-beam filament or the low-beam filament in such a way that the dimmer switch is changed-over depending upon ambient brightness, the presence of a car running in the opposite direction, etc. (refer to, for example, the official gazette of Japanese Utility Model Registration Application Publication No. 41742/1977).

The Automotive Safety Standards of Canada contain the provision of Daytime Running Lamp (hereinbelow, abbreviated to "DRL") that, while an automobile is running, head lamps each having an illuminating area of at least 40 cm$^2$ and a certain prescribed luminosity must be lit up even in the daytime.

In case of using the high beam of the head lamp, the certain prescribed luminosity signifies that luminosity of the central point (H-V point) of the optic axis of the high beam which ranges from 2,000 to 7,000 Cd inclusive. On the other hand, in case of using the low beam of the head lamp, the certain luminosity is stipulated in terms of a voltage value for driving the lamp, and the lamp must be lit up by the rated voltage thereof or by a voltage lowered to 75 thru 92% of the low-beam terminal voltage.

As the DRL stated above, it is considered to employ projector type auxiliary head lamps each of which is disposed separately from the conventional head lamp and is lit up simultaneously with the projection of a sub beam in order to enhance the light distribution performance of the low beam of the conventional head lamp. In many cases, however, the auxiliary head lamp does not satisfy the aforementioned condition of the illuminating area and cannot be used. Moreover, in the case of projecting the low beam of the head lamp with the rated voltage, the lifetime of the low-beam filament of the lamp shortens because this lamp is lit up even in the daytime. Therefore, it is common to employ a method in which a resistor is inserted in a lighting circuit for energizing the low-beam filament, whereby a voltage to be applied across the low-beam filament is lowered to 75 thru 92% of the terminal voltage of the low-beam filament.

The prior-art method stated above has the drawbacks that the loss of electric power which is consumed in the resistor is heavy and that the resistor is considerably expensive.

SUMMARY OF THE INVENTION

An object of the present invention is to provide a lighting control circuit for head lamps as can cope with the problems of the prior art explained above.

In a head lamp lighting circuit of left and right loops having a circuit which extends from a power source to a common terminal of high- and low-beam filaments of a left head lamp, a circuit which extends from the power source to a common terminal of high- and low-beam filaments of a right head lamp, a circuit by which a node connecting other terminals of the high-beam filaments of the left and right head lamps is connected to earth when a lighting switch is manipulated to a head lamp lighting position thereof or when a dimmer switch is manipulated to a passing-beam projection position thereof, and a circuit which extends from a node connecting other terminals of the low-beam filaments of the left and right head lamps, to the earth via a low-beam input terminal of the dimmer switch; the present invention consists in a lighting control circuit for head lamps comprising a first relay including a relay coil, as well as a normally-off type relay contact by which a circuit path between said node connecting said other terminals of said high-beam filaments of said left and right head lamps and a high-beam input terminal of said dimmer switch is turned "on" when said relay coil of said first relay is energized, a second relay including a relay coil, as well as a normally-off type relay contact by which a circuit path between said other terminals of said low-beam filaments of said left and right head lamps is turned "on" when said relay coil of said second relay is energized, and a third relay including a relay coil, as well as a transfer type relay contact by which said common terminal of said high- and low-beam filaments of either of said left and right head lamps is transferred from a side thereof connected to said earth, to a side thereof connected to said power source when said relay coil of said third relay is energized, wherein said relay coils of said first, second and third relays are energized when said lighting switch is manipulated to said head lamp lighting position thereof or when said dimmer switch is manipulated to said passing-beam projection position thereof.

Owing to the above construction, when the lighting switch is manipulated to the head lamp lighting position thereof or when the dimmer switch is manipulated to the passing-beam projection position thereof, the ordinary operation of lighting up the head lamps can be executed. On the other hand, when the lighting switch is turned "off" and the dimmer switch is manipulated to any position thereof other than the passing beam projection position, none of the relay coils of the first, second and third relays is energized. In consequence, no current flows through the low-beam projection circuits of the left and right head lamps, and the low beam of the left and right head lamps are extinguished. In this case, the current flows through the high-beam projecting series circuit of the left and right head lamps, and the high beams of the left and right head lamps are projected with a voltage corresponding to 50% of the rated voltage of the high-beam projection, whereby the light distribution characteristics of the DRL stipulated in the Automotive Safety Standard of Canada can be satisfied.

DESCRIPTION OF THE PREFERRED EMBODIMENTS

Figure 1:
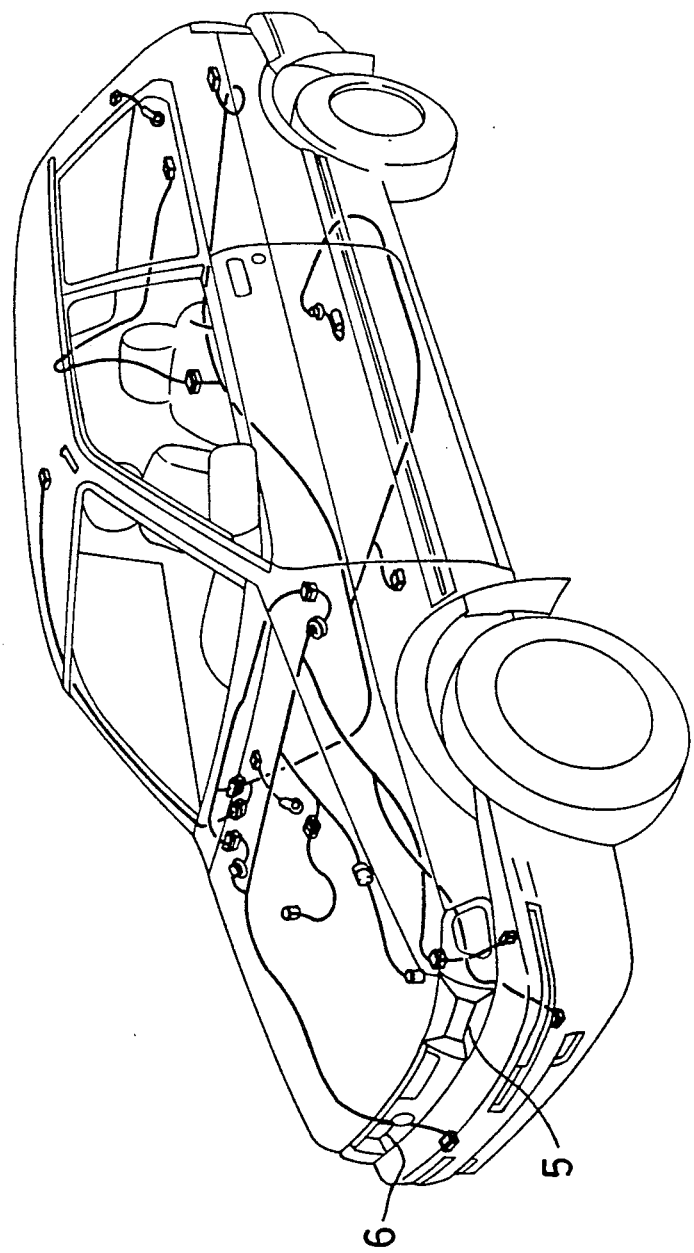
FIG. 1 is a perspective view of an electric circuit for left and right head lamps in an automobile according to the present invention.
Figure 2:
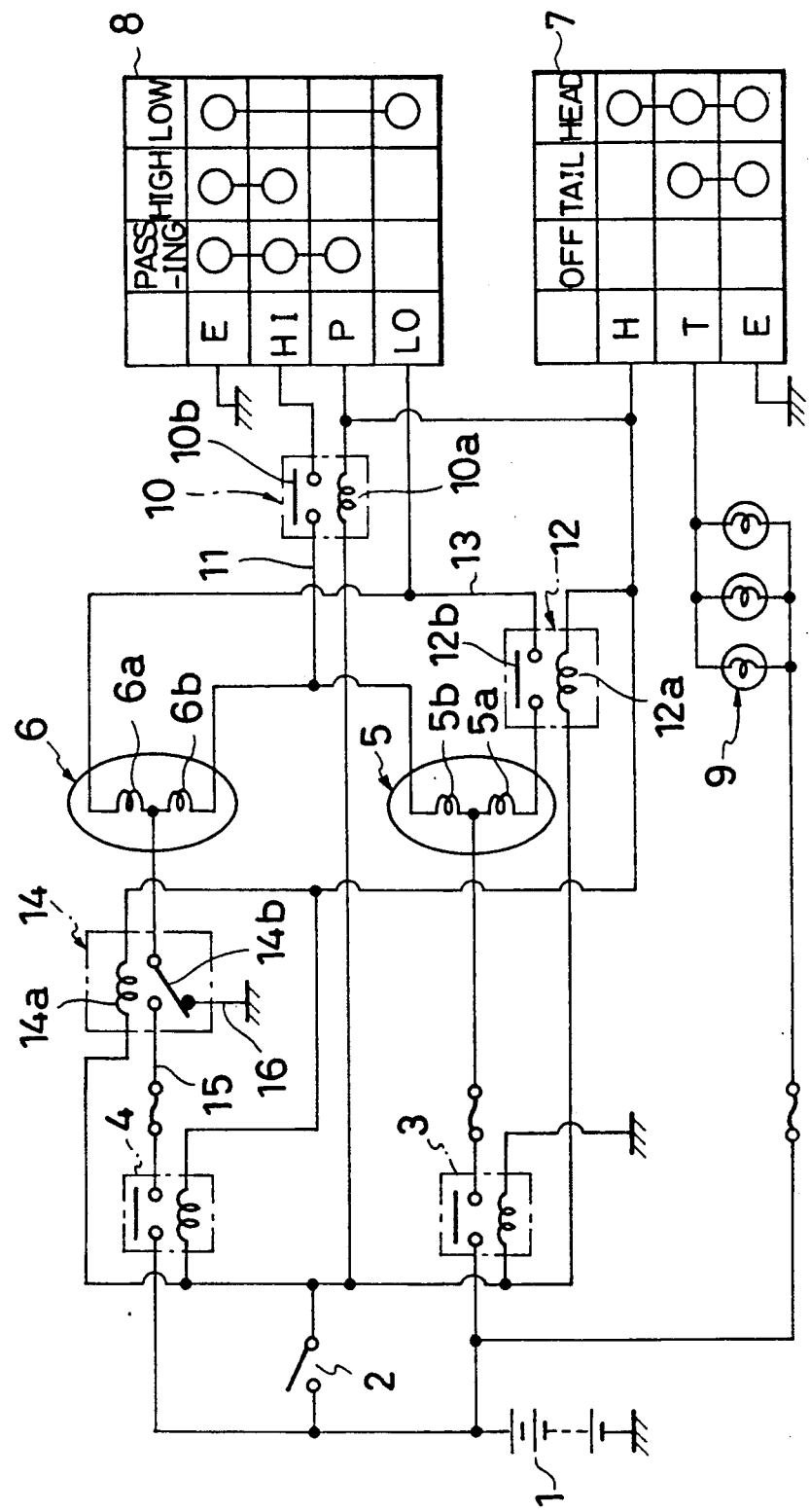
FIG. 2 is a circuit diagram of the electric circuit.

Here, described embodiments of the present invention in details with reference to accompanied drawings. FIG. 1 shows a schematic view of an electrical circuit harnessed in an automobile. FIG. 2 illustrates an embodiment of a lighting control circuit for lights. Referring to the figures, the embodiment includes a power source (battery) 1, a key switch 2, a left relay 3, a right relay 4, a left head lamp 5, a right head lamp 6, a lighting switch 7, and a dimmer switch 8. When the dimmer switch 8 is turned on after switching the key switch 2 and the lighting switch 7 on, a high-beam projection position HIGH or a passing-beam projection position PASSING can be selected. Then, electric current flows through a left head lamp high-beam projection circuit which extends from the power source 1 to a high-beam filament of the left lamp 5 via the relay 3 and a high-beam input terminal HI of the dimmer switch 8, and a right head lamp high-beam projection circuit which extends from the power source 1 to the earth via the right light relay 4, the high-beam filament 6b of the right head lamp 6 and the high-beam input terminal HI of the dimmer switch 8. Thus, the high-beam filaments 5b and 6b of both the left head lamp 5 and right head lamp 6 are energized.

On the other hand, with the key switch 2 manipulated into its "on" state, the lighting switch 7 is manipulated to the head lamp lighting position HEAD thereof, and the dimmer switch 8 is manipulated to the low-beam projection position LOW thereof. Then, currents flow through both a left head lamp low-beam projection circuit which extends from the power source 1 to the earth via the left light relay 3, the low-beam filament 5a of the left head lamp 5 and the low-beam input terminal LO of the dimmer switch 8, and a right head lamp low-beam projection circuit which extends from the power source 1 to the earth via the right light relay 4, the low-beam filament 6a of the right head lamp 6 and the low-beam input terminal LO of the dimmer switch 8. Thus, the low-beam filaments 5a and 6a of both the left head lamp 5 and right head lamp 6 are energized.

Numeral 9 designates a group of small lamps such as marker lamps and tail lamps. When the lighting switch 7 is manipulated to the tail lamp lighting position TAIL thereof, current flows through a small lamp group lighting circuit which extends from the power source 1 to the earth via the group of small lamps 9 and the tail lamp input terminal T of the lighting switch 7, and the group of small lamps 9 are lit up.

Numeral 10 indicates a first relay. The first relay 10 includes a relay coil 10a which is energized by the manipulation of the lighting switch 7 to the head lamp lighting position HEAD or by the manipulation of the dimmer switch 8 to the passing-beam projection position PASSING, and a normally-off type relay contact 10b which turns "on" a circuit path 11 when the relay coil 10a is energized. Herein, the circuit path 11 extends from a node connecting the other terminals of the high-beam filaments 5b and 6b of the left head lamp 5 and right head lamp 6 (these terminals being respectively remote from the common terminal of the low- and high-beam filaments 5a and 5b and the common terminal of the low- and high-beam filaments 6a and 6b), to the high-beam input terminal HI of the dimmer switch 8.

Numeral 12 indicates a second relay. Likewise to the first relay 10, the second relay 12 includes a relay coil 12a which is energized by the manipulation of the lighting switch 7 to the head lamp lighting position HEAD or by the manipulation of the dimmer switch 8 to the passing-beam projection position PASSING, and a normally-off type relay contact 12b which turns "on" a circuit path 13 when the relay coil 12a is energized.

Herein, the circuit path 13 connects the other terminals of the low-beam filaments 5a and 6a of the left head lamp 5 and right head lamp 6 (remote from the aforementioned common terminals).

Numeral 14 indicates a third relay. Likewise to each of the first relay 10 and second relay 12, the third relay 14 includes a relay coil 14a which is energized by the manipulation of the lighting switch 7 to the head lamp lighting position HEAD or by the manipulation of the dimmer switch 8 to the passing-beam projection position PASSING, and a transfer type relay contact 14b which turns "on" a circuit path 15 when the relay coil 14a is energized and which turns "off" the circuit path 15 and turns "on" a circuit path 16 when the relay coil 14a is not energized. Herein, the circuit path 15 connects either of the left head lamp 5 and the right head lamp 6 (for example, the right head lamp 6) to the right light relay 4, while the circuit path 16 connects the right head lamp 6 to the earth.

In the above construction, when the lighting switch 7 is manipulated to the head lamp lighting position HEAD or when the dimmer switch 8 is manipulated to the passing-beam projection position PASSING, both the normally-off type relay contacts 10b and 12b of the first relay 10 and second relay 12 are turned "on", and the transfer type relay contact 14b of the third relay 14 is transferred so as to turn "on" the circuit path 15 connecting the right head lamp 6 to the right light relay 4. Therefore, the ordinary operation of lighting up the head lamps 5 and 6 can be executed.

On the other hand, when the lighting switch 7 is turned "off" and the dimmer switch 8 is manipulated to any position thereof different from the passing-beam projection position PASSING, both the normally-off type relay contacts 10b and 12b of the first relay 10 and second relay 12 are turned "off", and the transfer type relay contact 14b of the third relay 14 is transferred so as to turn "off" the circuit path 15 connecting the right head lamp 6 to the right light relay 4 and to turn "on" the circuit path 16 connecting the right head lamp 6 to the earth. Therefore, current flows through that high-beam projecting series circuit of the left and right head lamps 5 and 6 which extends from the power source 1 to the earth via the left light relay 3, the high-beam filament 5b of the left head lamp 5, the high-beam filament 6b of the right head lamp 6, the transfer type relay contact 14b of the third relay 14, and the circuit path 16, and each of the high-beam filaments 5b and 6b of the left and right head lamps 5 and 6 is energized for high-beam projection by a voltage which is equal to ½ of the rated voltage of the ordinary high-beam projection, whereby the light distribution characteristic of the DRL stipulated in the Automotive Safety Standards of Canada can be fulfilled.

Figure 3:
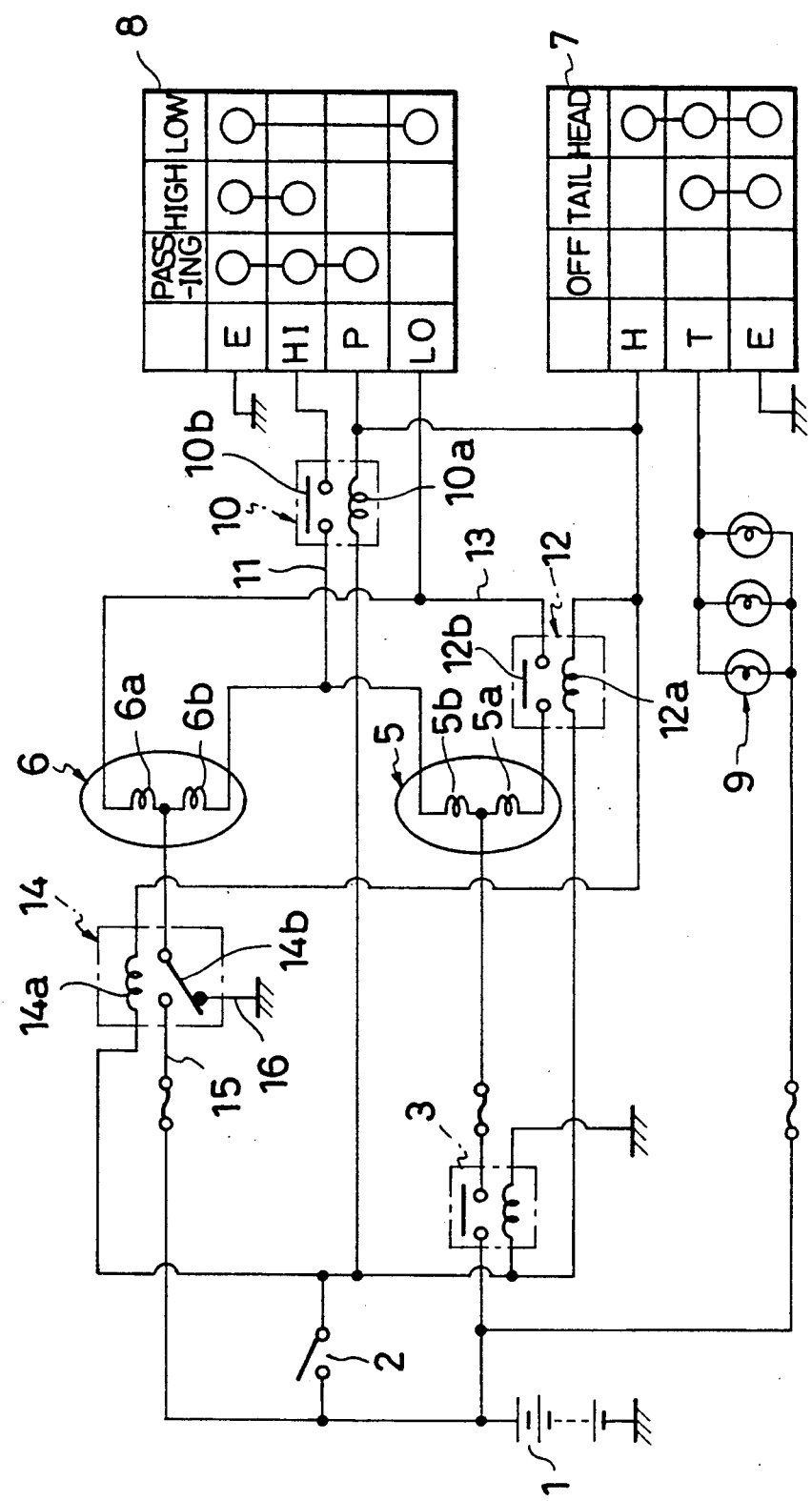
FIG. 3 is the circuit diagram according to another embodiment of the present invention.

Incidentally, the foregoing embodiment has mentioned the example in which the relay coil of the right light relay 4 is energized in interlocking with the manipulation of the lighting switch 7 to the head lamp lighting position HEAD or with the manipulation of the dimmer switch 8 to the passing-beam projection position PASSING. However, the relay coil of the right light relay 4 may well be energized in interlocking with only the "on" manipulation of the key switch 2 in such a way that this relay coil, one end of which is connected to the power source 1 through the key switch 2, has the other end thereof earthed directly. Besides, a function similar to the above is attained even when the right light relay 4 on the side on which the third relay 14 is inserted is omitted as illustrated in FIG. 3.

Further, as a matter of course, a single relay including two normally-off type relay contacts and one transfer type relay contact may well be employed instead of the provision of the first relay 10, second relay 12 and third relay 14 including the relay coils which are energized by the manipulation of the lighting switch 7 to the head lamp lighting position HEAD or by the manipulation of the dimmer switch 8 to the passing-beam projection position PASSING.

Figure 4:
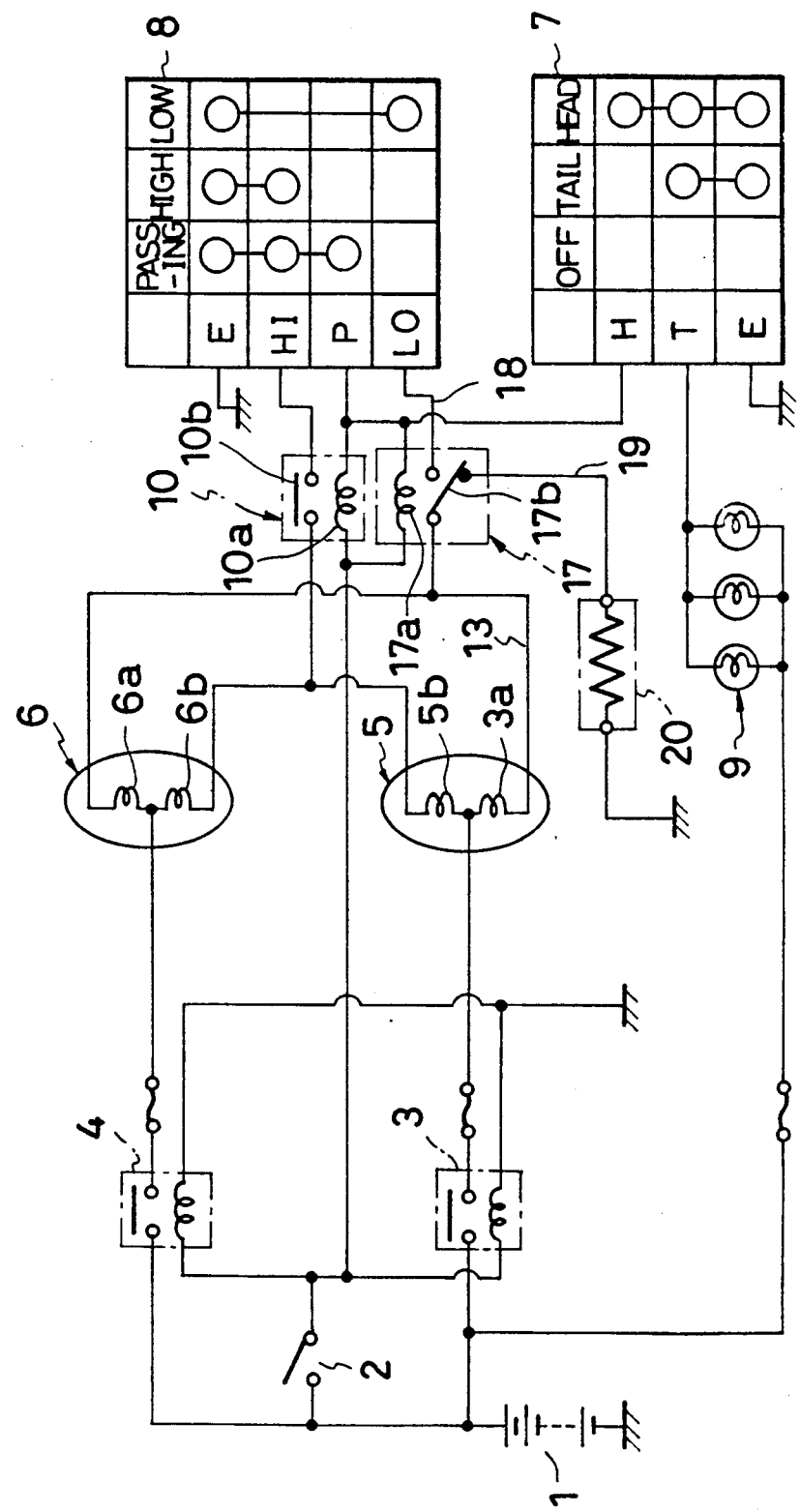
FIG. 4 shows the circuit diagram of a prior art.

Meanwhile, FIG. 4 shows a prior-art apparatus wherein a resistor is inserted in circuits for projecting low beams, thereby to lower terminal voltages which are applied across low-beam filaments. Components included in common in the present invention shown in FIGS. 2 and 3 have the same numerals assigned thereto, and shall not be explained in detail.

Numeral 17 designates a fourth relay. The fourth relay 17 includes a relay coil 17a which is energized similarly to the relay coil 10a of the first relay 10 by the manipulation of the lighting switch 7 to the head lamp lighting position HEAD or by the manipulation of the dimmer switch 8 to the passing-beam projection position PASSING, and a transfer type relay contact 17b which turns "on" a circuit path 18 when the relay coil 17a is energized and which turns "off" the circuit path 18 and turns "on" a circuit path 19 when the relay coil 17a is not energized. Herein, the circuit path 18 connects the circuit path 13, which connects the low-beam filaments 5a and 6a of the left head lamp 5 and right head lamp 6, to the low-beam input terminal LO of the dimmer switch 8. In addition, the circuit path 19 connects the circuit 13, which connects the low-beam filaments 5a and 6a, to the earth through the resistor 20.

In the above construction, when the lighting switch 7 is manipulated to the head lamp lighting position HEAD or when the dimmer switch 8 is manipulated to the passing-beam projection position PASSING, the normally-off type relay contact 10b of the first relay 10 is turned "on", and the transfer type relay contact 17b of the fourth relay 17 is transferred so as to turn "on" the circuit path 18 by which the circuit path 13 connecting the low-beam filaments 5a and 6a of the left head lamp 5 and right head lamp 6 is connected to the low-beam input terminal LO of the dimmer switch 8. Therefore, the ordinary operation of lighting up the head lamps 5 and 6 can be executed.

On the other hand, when the lighting switch 7 is turned "off" and the dimmer switch 8 is manipulated to any position thereof different from the passing-beam projection position PASSING, the normally-off type relay contact 10b of the first relay 10 is turned "off", and the transfer type relay contact 17b of the fourth relay 17 is transferred so as to turn "on" the circuit path 19 by which the circuit path 13 connecting the low-beam filaments 5a and 6a of the left head lamp 5 and right head lamp 6 is connected to the earth through the resistor 20. In consequence, currents flow through both a left head lamp low-beam dimmed-projection circuit which extends from the power source 1 to the earth via the left light relay 3, the low-beam filament 5a of the left head lamp 5, the circuit path 13, the transfer type relay contact 17b of the fourth relay 17, the circuit path 19 and the resistor 20, and a right head lamp low-beam dimmed-projection circuit which extends from the power source 1 to the earth via the right light relay 4, the low-beam filament 6a of the right head lamp 6, the circuit path 13, the transfer type relay contact 17b of the fourth relay 17, the circuit path 19 and the resistor 20. Thus, a voltage which is applied across each of the low-beam filaments 5a, 6a of the left and right head lamps 5, 6 can be lowered to about 75 to 92% inclusive, of the rated voltage of the ordinary low-beam projecting operation.

This method, however, has the problem that the loss of electric power which is consumed by the resistor 20 is considerable. Moreover, the resistor 20 forms a factor of increase in cost.

As described above, in a head lamp lighting circuit of left and right loops having a circuit which extends from a power source to a common terminal of high- and low-beam filaments of a left head lamp, a circuit which extends from the power source to a common terminal of high- and low-beam filaments of a right head lamp, a circuit by which a node connecting other terminals of the high-beam filaments of the left and right head lamps is connected to earth when a lighting switch is manipulated to a head lamp lighting position thereof or when a dimmer switch is manipulated to a passing-beam projection position thereof, and a circuit which extends from a node connecting other terminals of the low-beam filaments of the left and right head lamps, to the earth via a low-beam input terminal of the dimmer switch; the present invention consists in a lighting control circuit for head lamps comprising a first relay including a relay coil, as well as a normally-off type relay contact by which a circuit path between said node connecting said other terminals of said high-beam filaments of said left and right head lamps and a high-beam input terminal of said dimmer switch is turned "on" when said relay coil of said first relay is energized, a second relay including a relay coil, as well as a normally-off type relay contact by which a circuit path between said other terminals of said low-beam filaments of said left and right head lamps is turned "on" when said relay coil of said second relay is energized, and a third relay including a relay coil, as well as a transfer type relay contact by which said common terminal of said high- and low-beam filaments of either of said left and right head lamps is transferred from a side thereof connected to said earth, to a side thereof connected to said power source when said relay coil of said third relay is energized, wherein said relay coils of said first, second and third relays are energized when said lighting switch is manipulated to said head lamp lighting position thereof or when said dimmer switch is manipulated to said passing-beam projection position thereof. Owing to this construction, when the lighting switch is manipulated to the head lamp lighting position thereof or when the dimmer switch is manipulated to the passing-beam projection position thereof, the ordinary operation of lighting up the head lamps can be executed. On the other hand, when the lighting switch is turned "off" and the dimmer switch is manipulated to any position thereof other than the passing-beam projection position, none of the relay coils of the first, second and third relays is energized. In consequence, no current flows through the low-beam projection circuits of the left and right head lamps, and the low beams of the left and right head lamps are extinguished. On this occasion, however, current flows through the high-beam projecting series circuit of the left and right head lamps, and the high beams of the left and right head lamps are projected with a voltage corresponding to 50% of the rated voltage of the high-beam projection, whereby the light distribution characteristic of the DRL stipulated in the Automotive Safety Standards of Canada can be satisfied. Thus, unlike the prior art wherein a resistor is inserted in low-beam projection circuits for left and right head lamps, whereby a terminal voltage across each of low-beam filaments of the left and right head lamps is lowered to, for example, 75 to 92% inclusive, of a rated voltage for ordinary low-beam projection, the terminal voltage of each of the high-beam filaments of the left and right head lamps can be set at 50% of the rated voltage of the high-beam projection. Therefore, the present invention can bring forth such excellent effects that the lifetime of each of the left and right head lamps can be lengthened and that curtailment in cost can be attained because the resistor is dispensed with.

What is claimed is:

1. In a head lamp lighting circuit of left and right loops having a circuit which extends from a power source to a common terminal of high- and low-beam filaments of a left head lamp, a circuit which extends from the power source to a common terminal of high- and low-beam filaments of a right head lamp, a circuit by which a node connecting other terminals of the high-beam filaments of the left and right head lamps is connected to earth when a lighting switch is manipulated to a head lamp lighting position thereof or when a dimmer switch is manipulated to a passing-beam projection position thereof, and a circuit which extends from a node connecting other terminals of the low-beam filaments of the left and right head lamps, to the earth via a low-beam input terminal of the dimmer switch; a lighting control circuit for head lamps comprising a first relay including a relay coil, as well as a normally-off type relay contact by which a circuit path between said node connecting said other terminals of said high-beam filaments of said left and right head lamps and a high-beam input terminal of said dimmer switch is turned "on" when said relay coil of said first relay is energized, a second relay including a relay coil, as well as a normally-off type relay contact by which a circuit path between said other terminals of said low-beam filaments of said left and right head lamps is turned "on" when said relay coil of said second relay is energized, and a third relay including a relay coil, as well as a transfer type relay contact by which said common terminal of said high- and low-beam filaments of either of said left and right head lamps is transferred from a side thereof connected to said earth, to a side thereof connected to said power source when said relay coil of said third relay is energized, wherein said relay coils of said first, second and third relays are energized when said lighting switch is manipulated to said head lamp lighting position thereof or when said dimmer switch is manipulated to said passing-beam projection position thereof.

2. A lighting control circuit for head lamps as defined in claim 1, further comprising a left light relay which includes a relay coil that is connected at one end to one end of each of said relay coils of said first, second and third relays and connected at the other end to said earth, and a normally-off type relay contact that is connected between said power source and said common terminal of said high- and low-beam filaments of said left head lamp and that is turned "on" when said relay coil of said left light relay is energized.

3. A lighting control circuit for head lamps as defined in claim 2, further comprising a right light relay which includes a relay coil that is connected at one end to said one end of each of said relay coils of said first, second and third relays and said one end of said left light relay and connected at the other end to the other end of said relay coil of said third relay and said head lamp lighting position of said lighting switch, and a normally-off type relay contact that is connected between said power source and said common terminal of said high- and low-beam filaments of said right head lamp and that is turned "on" when said relay coil of said right light relay is energized.

4. A lighting control circuit for head lamps as defined in claim 1, wherein said first, second and third relays are implemented in the form of a single relay which includes two normally-off type relay contacts and one transfer type relay contact.

* * * * *